United States Patent [19]

Iseler et al.

[11] Patent Number: 4,622,354

[45] Date of Patent: Nov. 11, 1986

[54] PHASE STABILIZED POLYESTER MOLDING MATERIAL

[75] Inventors: Kenneth A. Iseler, Richmond; Probir K. Guha, Mt. Clemens; Robert C. Yen, Troy, all of Mich.

[73] Assignee: The Budd Company, Troy, Mich.

[21] Appl. No.: 790,096

[22] Filed: Oct. 22, 1985

[51] Int. Cl.$^4$ .......................... C08L 67/00; C08K 3/40
[52] U.S. Cl. .................... 523/527; 523/500; 523/511; 525/19; 525/28
[58] Field of Search ............... 523/500, 511, 527; 525/19, 28

[56] References Cited

U.S. PATENT DOCUMENTS

| | | | |
|---|---|---|---|
| 3,002,869 | 10/1961 | Hough et al. | 154/43 |
| 3,663,500 | 5/1972 | Crabtree et al. | 260/40 |
| 3,721,643 | 3/1973 | Vargiu et al. | 260/40 |
| 3,830,772 | 8/1974 | Bush et al. | 260/40 |
| 3,933,728 | 1/1976 | Henbest | 260/37 |
| 4,038,341 | 7/1977 | Schwartz, Jr. | 260/40 |
| 4,038,342 | 7/1977 | Schwartz, Jr. | 526/15 |
| 4,067,845 | 1/1978 | Epel et al. | 260/40 |
| 4,086,203 | 4/1978 | Shaw et al. | 428/392 |
| 4,101,604 | 7/1978 | Rowe | 260/40 |
| 4,172,059 | 10/1979 | Atkins et al. | 260/40 |
| 4,210,571 | 7/1980 | Herman | 260/40 |
| 4,210,572 | 7/1980 | Herman et al. | 260/40 |
| 4,260,538 | 4/1981 | Iseler et al. | 525/19 |
| 4,262,100 | 4/1981 | Dunleavy et al. | 525/445 |
| 4,296,020 | 10/1981 | Magrans, Jr. | 264/331 |
| 4,327,145 | 4/1982 | Mitani et al. | 428/290 |
| 4,374,215 | 2/1983 | Atkins | 523/514 |
| 4,535,110 | 8/1985 | Iseler et al. | 524/196 |

*Primary Examiner*—Lewis T. Jacobs
*Attorney, Agent, or Firm*—Harness, Dickey & Pierce

[57] ABSTRACT

The present invention relates to the discovery and development of a novel class of phase stabilization additives for thermoset polyester resins. The use of these materials imparts improved glass read out and superior homogeneity when compared to art-disclosed systems thus producing an overall improved Class A quality thermoset polyester resin surface finish for a variety of products.

The phase-stabilizing agents or additives of the present invention comprise a select group of compounds from three classes: fatty acids, dimer acids, and polyester polyols. More specifically, the phase-stabilizing agents of the present invention comprises a compound selected from the group consisting of:

(i) a saturated or unsaturated $C_5$ to $C_{28}$ fatty acid;
(ii) a $C_{20}$ to $C_{54}$ dimer acid or trimer acid; or
(iii) a polyester polyol having an average molecular weight of about 200 to about 6,500.

54 Claims, No Drawings

PHASE STABILIZED POLYESTER MOLDING MATERIAL

The present invention relates to the discovery and development of a novel class of phase stabilization additives for thermoset polyester resins. The use of these materials imparts improved glass read out and superior homogeneity when compared to art-disclosed systems thus producing an overall improved Class A quality thermoset polyester resin surface finish for a variety of products. Further, the phase stabilization agents of the present invention are compatible with so-called "low shrink additives" useful with thermoset polyester resin, and may optionally be used with them. The combination results in a significant improvement in aesthetic, surface, and dynamic impact properties over those exhibited by any of the art-disclosed systems.

BACKGROUND OF THE INVENTION

The phase-stabilizing agents or additives of the present invention comprise a select group of compounds from three classes: fatty acids, dimer acids, and polyester polyols. More specifically, the phase-stabilizing agents of the present invention comprises a compound selected from the group consisting of:
  (i) a saturated or unsaturated $C_5$ to $C_{28}$ fatty acid;
  (ii) a $C_{20}$ to $C_{54}$ dimer acid or trimer acid; or
  (iii) a polyester polyol having an average molecular weight of about 200 to about 6,500.

Compounds of the above classes have been used as additives for thermoset polyester resins and other polymer resins.

For example, U.S. Pat. No. 4,210,571 discloses compounds which are useful as "surfactant coupling agents" in the preparation of thermosetting resin compositions. The materials include carboxylic acid ester derivatives of mono-, di-, and tri-hydroxy fatty acid esters of $C_1$ to $C_4$ mono- and polyhydric alcohols. The patentee suggests that these agents are particularly useful in reducing the viscosity of highly-bonded filler prepolymer pastes to improve the dispersion of the filler and to promote the interaction of the filler and prepolymer so as to maintain and improve the properties of the final cured resin.

U.S. Pat. No. 4,210,572 discloses a thermosetting resin composite having an inorganic filler material and coupling agent. The coupling agents disclosed include mono-, di-, and tri-long chain fatty acid esters of $C_1$ to $C_4$ mono- and polyhydric alcohols and polyoxyethylene derivatives of mono-, di-, and tri-hydroxy fatty acid esters of $C_1$ to $C_4$ mono- and polyhydric alcohols. The patentee suggests that the coupling agent is useful in reducing the viscosity of highly loaded filler prepolymer pastes to improve the dispersion of the filler and promote an interaction between the filler and the prepolymer.

U.S. Pat. No. 4,172,059 discloses a viscosity-reducing agent comprised of an aliphatic monocarboxylic acid having at least 6 carbon atoms in the chain. The aliphatic monocarboxylic acid employed usually has at least 6 carbon atoms in the chain and is frequently a saturated or unsaturated fatty acid having from 6 to 24 or more carbon atoms in the chain. The carboxylic acids may be caproic, caprylic, capric, lauric, myristic, palmitic, palmitoleic, stearic, oleic, linoleic, linolenic, and the like.

The patentee further suggests that when used in an SMC (sheet molding composition) application where the thermoplastic is a polyalkyl acrylate or methacrylate, a viscosity-reducing agent which is an unsaturated aliphatic monocarboxylic acid of at least 6 carbon atoms is employed. Such aliphatic monocarboxylic acids are frequently an unsaturated fatty acid having from 6 to 24 or more carbon atoms in the chain and includes 9-dodecenoic, 9-tetradecenoic, palmitoleic, oleic, linoleic, linolenic, and the like, and the acid may be either straight chained or branched.

It has now been surprisingly discovered that certain additives, some of which are suggested in the art as viscosity-reducing agents, are useful in a specific SMC application as phase-stabilizing agent in spite of the fact that these compounds, in many cases, actually increase viscosity.

SUMMARY OF THE INVENTION

The present invention relates to the discovery and development of a novel class of phase stabilization agents or additives for a thermoset polyester resin. These agents prevent phase separation of the constituents of the final system. As a result of the phase uniformity which results from the presence of the phase stabilizing agents, the different resins do not undergo gross separation during the maturation period at 90°–104° F.; the final cured product exhibits an improved Class A quality surface finish. The product also demonstrates a significant overall improvement in aesthetic, surface and (retains) good impact properties when compared with identical systems without these agents.

In general, the phase-stabilizing agents or additives of the present invention are selected from the group consisting of fatty acids, dimer acids, trimer acids, polyester polyols, and mixtures thereof.

The preferred fatty acids include $C_5$–$C_{28}$ saturated and unsaturated fatty acids. The preferred dimer and trimer acids include $C_{20}$ to $C_{54}$ acids. The preferred polyester polyols have an average molecular weight of about 200 to about 6,500; additionally, the polyol materials preferably possess an average functionality of about 2 to about 4.

These phase stabilization agents are particularly useful in sheet molding composition which employ an unsaturated polyester resin, an ethylenically unsaturated monomer with a free radical catalyst, and optionally, a filler, a reinforcing material, a mold release agent, a low profile additive or mixture of two or more low profile additives, a Group IIA metallic oxide or hydroxide, and a linear oligomer having a molecular weight of about 400–200,000, preferably 10,000 to about 50,000; and optimally an isocyanate terminated prepolymer.

DETAILED DESCRIPTION OF THE INVENTION

It will be appreciated from the background discussion herein that certain fatty acids, dimer acids, and polyols have been suggested as being useful as additives in thermoset polyester resin systems to reduce the viscosity of such systems.

The present invention is predicated upon the discovery that certain classes of materials, some of which include materials disclosed in the art as viscosity reducers, actually increase the viscosity of polyester systems; notwithstanding such increases in viscosity, however, the additives and agents of the present invention are extremely useful as phase-stabilizing agents in certain polyester resin systems.

The present invention relates to the development of a phase-stabilizing agent or additive for use in thermoset polyester resin products. More specifically, the present invention comprises employing a fatty acid, dimer acid, or a polyester polyol. The use of such compounds, in spite of the resulting increase in the viscosity of the overall system (or in some cases the negligible effect on viscosity), results in a system which retains its phase stability even under the high temperatures and conditions encountered in molding processes and, more importantly, during the maturation process.

The materials useful in the practice of the present invention comprise four groups of materials from three classes. These include fatty acids, dimer acids, and polyester polyols.

The fatty acids useful in the present invention are the $C_5$ to $C_{22}$ saturated and unsaturated, branched or straight chain, fatty acids. Preferred materials include lauric, palmitic, stearic, oleic, linoleic, linolenic, caproic, caprylic, capric, myristic, palmitoleic acid, cerotic, cetoleic, and mixtures thereof. Highly preferred materials include lauric, palmitic, stearic, oleic, linoleic, linolenic acids, and mixtures thereof. In a highly preferred embodiment, a mixture of stearic and oleic acids is employed. These materials are items of commerce and are generally obtained by extraction from beef tallow, coconut oil, corn oil, cottonseed oil, olive oil, palm oil, palm kernel oil, and the like.

The preferred dimer and trimer acids useful in the practice of the present invention are the $C_{30}$–$C_{54}$ materials, i.e., those containing about 30 to about 54 carbon atoms. These are generally dibasic acids. They may be joined at the nonfunctional end or, in the case of a dimerization of any two unsaturated acid molecules, may be joined at the middle (unsaturated) positions. Mixture of such material may also be employed.

Particularly preferred are dimer or trimer acids prepared from the monomeric materials recited above, i.e., dimer acids prepared by the union of at least two (and in the case of trimer acids—three) acid moeities selected from lauric, palmitic, stearic, oleic, linoleic, linolenic, caproic, caprylic, capric, myristic, and palmitoleic acids. Even more preferred are the dimer acids having about 36 carbon atoms, i.e., prepared by the union of two or more $C_{18}$ fatty acids and trimer acids having about 54 carbon atoms.

The third class of phase stabilization additives or agents useful in the practice of the present invention are polyester polyols; mixtures of polyester polyols may also be employed. The preferred polyols, or mixtures of polyols, have an average molecular weight in the range of about 200 to about 6,500. More preferably, the polyol employed has an average molecular weight of about 300 to about 5,000, and still more preferably about 400 to about 4,500, and still more preferably about 600 to about 4,000. In a highly preferred embodiment, the polyol employed has an average molecular weight of about 1,000 to about 3,000.

The polyols preferred for use in the practice of the present invention possess an average functionality of about 2 to about 4, and preferably about 2 to about 3.

The agents or additives described herein are useful in the phase stabilization of thermoset polyester resin.

In general, thermosetting polyester resin systems, particularly for sheet molding applications, have at least two distinct phases as a result of the diverse nature and character of the polyester resin component and the other components, as well as necessary monomers or carriers. In the maturation and molding process the various components have a tendency to separate. As a result, most advanced SMC matrices employ a low profile additive to retard or prevent shrinkage of the molded part during maturation. The polyester resin and the low profile additive are generally present—prior to the molding process—in two finely dispersed phases. During the maturation or molding process, the low profile agent prevents shrinkage by micro-phase separation; thus, micro-phase separation is acceptable. It is this micro-phase separation that provides the low-shrink action. However, if gross phase separation is allowed during the maturation process, such separation would result in surface flaws and imperfections which are unacceptable. This problem is especially critical in producing a Class A quality surface finish. Reducing or preventing gross phase separation is therefore highly desirable in such operations.

Accordingly, the phase-stabilizing agents or additives of the present invention are particularly useful in thermosetting polyester resin systems aimed at SMC applications. In general, these systems comprise:
(a) an unsaturated polyester resin;
(b) an ethylinically unsaturated monomer (with a free radical catalyst);
(c) a filler;
(d) a reinforcing material;
(e) a mold release agent;
(f) a low profile additive, or mixture of several;
(g) a Group IIA metal oxide or hydroxide; and
(h) a linear oligomer having a molecular weight in the range of about 400 to about 200,000, preferably about 10,000 to about 50,000.

Preferred systems for use in the present invention are described in U.S. Pat. Nos. 4,067,845 and 4,260,538, both expressly incorporated herein by reference. A particularly preferred system is described in U.S. Pat. No. 4,535,110, "Dual Functional Additive", Iseler, Kenneth A., et al, and assigned to The Budd Company, Troy, Mich., also incorporated herein by reference. Such a system employs an isocyanate terminated urethane polymer composition as a dual functional additive.

The preferred SMC contemplated for use with the present invention is comprised essentially of the following ingredients: (a) an unsaturated polyester resin having (1) a ratio of hydroxyl groups to carboxyl groups of between 5.7 and 0.8, and (2) an acid number of at least 14, and (3) an average molecular weight between about 800 and 5,000; (b) a phase-stabilizing agent selected from the group consisting of $C_5$–$C_{28}$ fatty acids, $C_{20}$–$C_{54}$ dimer or trimer acids, polyester polyols having an average molecular weight of about 200 to about 6,500, or mixtures thereof; (c) a dual thickening system comprised of an isocyanate terminated urethane prepolymer in an amount sufficient to react with at least 10 percent, but not more than 105 percent of the hydroxyl groups present, and a metallic oxide or hydroxide selected from Group IIA of the periodic table and consisting of calcium and magnesium oxides or hydroxides in an amount to react with at least 30 percent, but not more than 75 percent of the carboxyl groups present; (d) an ethylinically unsaturated monomer and a free radical polymerization catalyst; (e) an inert filler; (f) a fiberous reinforcing material; (g) a mold release agent; and (h) an isocyanate terminated urethane prepolymer composition having an equivalent ratio of NCO to OH from about 1.2/1 to about 5/1, comprising a polyol and a di- or polyisocyanate, and being prepared by reacting (1) one equivalent weight of a polyol having an average molecular weight of about 600 to 4,000 and an average functionality of approximately 2 to approximately 6; and (2) 1.2 to 5 equivalent weights of a di- or polyisocyanate selected from the group consisting of 80:20 or 65:35 isomer mixture of the 2,4- and 2,6-isomeric forms of toluene di-isocyanate, ethylene di-isocyanate, propylene di-isocyanate, meta- and para-phenyl di-isocyanate, 4,4'-diphenyl methane di-isocyanate (MDI) or a mixture of MDI and its trifunctional cyclic adduct products containing carbodiimide linkages, 1,5-naphthalene di-isocyanate, para- and meta-xylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic/aliphatic polyisocyanates and polyfunctional aliphatic isocyanates; wherein said reactants combine in a one-step addition process to yield an isocyanate terminated urethane prepolymer of controlled molecular weight to impart improved low shrink, dynamic impact strength and molding characteristics as measured by viscosity index properties in thermoset polyester resin products, and particularly sheet molding compositions (SMC) by covalently bonding to the polyester resin matrix of the SMC.

When employed in the sheet molding compounds described herein, the phase-stabilizing agent or additive is blended in any conventional manner into the portion which contains the polyester resin. If this material is liquid, it may be premixed with an organic monomeric solvent such as an ethylinically unsaturated monomer selected from the group consisting of styrene, vinyl toluene, or vinyl acetate. It is ordinarily employed at a level of about 0.25 to about 20 percent by weight of the unsaturated polyester resin. More preferably, the phase-stabilizing agent or additive is employed at a level of about 1.0 to about 8, and still more preferably about 2 to about 7 percent by weight of unsaturated polyester resin. In a highly preferred embodiment, the phase-stabilizing agent or additive is employed at a level of about 3 to about 6 percent by weight of unsaturated polyester resin.

In general, the SMCs of the present invention are prepared by mixing, blending, or otherwise contacting three submixtures or parts together. The first submixture or part generally contains the polyester resin, the low profile additive, the free radical catalyst, a polyol, the mold release agent, as well as other additives discussed in U.S. Pat. No. 4,535,110. It is to this first submixture that the phase-stabilizing additives or agents are added. The second submixture or part generally contains the Group IIA metal oxide (or hydroxide), the pigment, and the carrier resin, such as an acrylic (which does not react with the Group IIA metal oxide or hydroxide).

The third submixture or part is the dual functional additive or prepolymer described in U.S. Pat. No. 4,535,110, entitled "Dual Functional Additive".

The useful isocyanate terminated urethane prepolymers are based upon a polyether or polyester polyol, or a mixture thereof, and preferably a polyether polyol, and a di-isocyanate or polyisocyanate. The polyol used in the prepolymer is preferably a diol or triol having a molecular weight of approximately 600 to approximately 4,000, and preferably about 2,000, as exemplified by BASF's Pluracol P-2010, and a functionality of approximately 2 to approximately 6, preferably 2 to 3 and more preferably 2. The dual functional additive is formed in a one-step addition reaction between one equivalent weight of the polyol as described above and two equivalent weights of the polyisocyanate in the presence of approximately 0–1% of a conventional urethane catalyst such as stannous octoate, dibutyltin dilaurate, and the like, and the amount of such catalyst is determined according to the total weight of the urethane.

The isocyanate terminated urethane additive thus formed should have an isocyanate to hydroxyl ratio NCO/OH of approximately 1.2/1 to approximately 5/1, and preferably NCO/OH between 1.8 to 3, and most preferably about 2.

The isocyanate terminated urethane prepolymer is prepared by first reacting an organic polyisocyanate, and preferably a di-isocyanate with a polyol, using standard procedures to yield an isocyanate terminated prepolymer of controlled molecular weight and having an NCO/OH ratio of approximately 1.2/1 to approximately 5/1, and preferably NCO/OH between 1.8 to 3, and most preferably about 2.

The polyisocyanates used in the formation of the present invention include toluene di-isocyanate, such as the 80:20 or 65:35 isomer mixture of the 2,4- and 2,6 isomeric forms, ethylene di-isocyanate, propylene di-isocyanate, meta- and para-phenyl di-isocyanates, 4,4'-diphenyl methane di-isocyanate (MDI) or a mixture of MDI and its trifunctional cyclic adduct products containing carbodiimide linkages, 1,5 naphthalene di-isocyanate, para- and meta-xylene di-isocyanates, alkylene di-isocyanates such as tetra-methylene di-isocyanate and hexamethylene di-isocyanate, 2,4- and 2,6 di-isocyanate methylcyclohexane, dicyclohexylmethane di-isocyanate, and polymeric MDI containing an average of from two isocyanate groups per molecule. Other polyisocyanates which may be employed include polyisocyanate of toluene di-isocyanate, polyisocyanate prepolymers of aromatic type, toluene di-isocyanate based adducts, aromatic/aliphatic polyisocyanates and polyfunctional aliphatic isocyanate. The exact polyisocyanate employed is not critical, but di-isocyanates are preferred, and of these, 4,4' diphenyl methane di-isocyanate (MDI) or a mixture of MDI and its trifunctional cyclic adduct products containing carbodiimide linkages are preferred. It should be noted that differing results in respect to low shrinkage additives will be obtained by the use of different polyisocyanates and it is emphasized that di-isocyanates are preferred.

The polyol reactant used in the dual functional additive is selected from either a polyester polyol or polyether polyol, preferably polyether polyols and mixtures of two or more such polyether polyol compounds. The polyol reactant, or mixture thereof, used has an average equivalent weight of between 600 to 4,000 and a functionality of between 2 and 6, and preferably 2 to 3 and more preferably 2.

Among suitable polyether polyols, it is contemplated that polyoxyalkylene polyols and mixtures thereof may be used. These can be prepared according to well known methods, such as by condensing an alkylene oxide, or mixture of alkylene oxides using random or stepwise addition, with a polyhydric initiator or a mixture of polyhydric initiators.

The alkylene oxides contemplated for use in the prepolymer include ethylene oxides, propylene oxide, butylene oxides, amylene oxide, aralkylene oxides, such as trichlorobultylene oxide and such, and the most preferred alkylene oxide is propylene oxide or a mixture thereof with ethylene oxide using random or stepwise oxyalkylation.

Polyhydric initiators used in preparing the prepolymer polyether polyol reactant include (a) aliphatic diols such as ethylene glycol, 1,3-propylene glycol, 1,2-propylene glycol, butylene glycols, butane diols, pentane diols and the like, (b) the aliphatic triols such as glycerol, trimethylolpropane, triethylolpropane, trimethylolhexane and the like, (c) the polyamines such as tetraethylene diamine and (d) the alkanolamines such as diethanolamine, triethanolamine, and the like. Preferably, the polyhydric initiators of choice for use in preparing the polyether polyol reactant is an aliphatic diol or triol such as ethylene glycol, propylene glycol, glycerol, trimethylolpropane, and the like.

If a polyester polyol is selected for use as the polyol reactant of the dual functional additive, such a polyol is usually formed by reacting a polycarboxylic acid with a polyhydric initiator, such as a diol or triol. The polycarboxylic acids include oxalic, malonic, succinic, glutaric, adipic, pimelic, suberic, azelaic acid, and the like. Illustrative polyhydric alcohols include various diols and triols and higher functionality alcohols such as ethylene glycol, 1,3-propylene glycol, 1,2-propylene glycol, butylene glycols, butane diols, pentane diols, glycerol, trimethylolpropane, trimethylolhexane, hexane 1,2,6-triol and the like.

When a polyether polyol reactant is to be created by the alkylene oxide polyhydric initiator reaction, usually a catalyst, such as the art-disclosed catalyst KOH, is added to speed up the reaction. The resulting polyether polyol should have an average molecular weight of approximately 600 to 4,000, After reaction, the catalyst is preferably removed, leaving a polyether polyol suitable for reaction with the polyisocyanate reactants as discussed above to form the isocyanate terminated urethane prepolymer of the present invention.

In forming the isocyanate terminated urethane prepolymer, one equivalent weight of the polyol reactant as defined above is reacted with 1.2 to 5, and preferably two equivalent weights of a polyisocyanate as defined previously in the presence of any conventional urethane catalysts such as stannous octoate, dibutyltin dilaurate and the like, whereby the isocyanate groups are placed on the terminal ends of the prepolymer, thereby yielding the isocyanate terminated urethane prepolymer. It should be noted that the prepolymer may be made in the presence of a monomer or a monomer may be added to or dissolved in the monomer after it has been made, without adversely affecting its function as a low profile additive and as a viscosity index modifier to impart the desired advantages.

The isocyanate terminated urethane prepolymer additive may optionally be used with any of the conventional low shrink additives of the prior art, such as polyvinyl acetate and polymethyl methacrylate or a mixture thereof, or any other linear oligomer having a molecular weight within the range of approximately 400 to about 200,000, and preferably about 10,000 to approximately 90,000.

Moreover, regardless of whether or not the prepolymer is used with a conventional low shrink additive, the ratio of the total amount of prepolymer to polyester resin should optimally be within the range of approximately 10 parts by weight of prepolymer to 90 parts by weight of polyester resin, to approximately 60 parts by weight of prepolymer to 40 parts by weight of polyester resin.

When used in an SMC as defined above, the isocyanate terminated urethane prepolymer may be dissolved in styrene and then used like any other low shrink additive, and is employed in an amount sufficient to react with at least 10 percent but not more than 105 percent of the hydroxyl groups present in the reaction.

The metallic oxide or hydroxide used in the dual thickening system is essentially a metal oxide or hydroxide from the Group IIA on the periodic table and comprises calcium or magnesium. Although calcium may be used in its various oxides and hydroxides, the magnesium is preferred inasmuch as superior results are achieved by the use of magnesium. Although the prepolymer may be used alone, it may also be used with a monomer from the group styrene, vinyl toluene and vinyl acetate and any other ethylinically unsaturated monomer and when so used, is ordinarily present in an amount to give 0.5 to 3.5 moles of monomer unsaturation per mole of unsaturation in the unsaturated polyester resin. Styrene and vinyl toluene are preferred monomers, although others may be used.

A free radical polymerization catalyst is also employed in the present invention. The catalyst is preferably present in an amount of 1.0 part per 100 parts of total resin and monomer, the parts being measured by weight. The free radical polymerization catalyst is added to the uncured composition so that upon heating to the activation temperature, the additive type cross-linking polymerization reaction will commence between the polymerizable monomer and the unsaturated polyester resin to form the matrix previously described. The catalyst is usually employed in an amount in the range of about 0.1 to 3.0 parts per 100 parts of the total monomer and resin and is usually a peroxide.

The mold release agent useful in the present invention may be any of those used in the prior art, such as zinc stearate, calcium stearate, magnesium stearate, organic phosphate esters and other organic liquid internal mold release agents. They may be employed at their art-disclosed level.

The reinforcing fibers are usually present in an amount of about 10 to 80 weight percent for sheet molding compositions and is preferably fiberglass. The preferred range for this reinforcing fiber is approximately 15 to 80 weight percent for use in thermoset polyester resin applications, such as an SMC.

Any number of nonreinforcing fillers may be added to the composition to reduce overall material costs without sacrificing a significant degree of the desirable physical properties in the final product, or may be added to impart specific properties to the uncured compound. Any number of fillers may be used in an amount ranging from about 20 parts to 1,000 parts by weight per 100 parts of the pure polyester resin in thermoset polyester resin applications, such as an SMC.

In addition, the invention may, as previously stated, include a low shrink additive polymer or mixture, which is ordinarily dissolved in the same type of ethylinically unsaturated monomer in which the polyester resin is dissolved. Such low shrink additives include, without limitation, those disclosed in U.S. Pat. No. 4,535,110, previously incorporated by reference.

In employing the dual functional additive described herein with thermoset polyester resin products as defined in Epel et al, and especially sheet molding compositions (SMC), the unsaturated polyester resin as described in Epel et al is dissolved in a monomer such as styrene, vinyl acetate or vinyl toluene. The dual thickening system of Epel et al may be modified by the replacement of the organic polyisocyanate defined therein with the dual functional additive described above. A heat-activated free radical catalyst, such as an organoperoxide, hydroperoxide or azo compound, preferably a peroxide, is added to the polyester resin material. Inert fillers may be added to reduce the overall cost of the SMC while not appreciably sacrificing the essential properties of the SMC. The modified dual thickening system is then added to the polyester resin in an amount such that the total amount of prepolymer to polyester resin is within the range of approximately 10 part by weight of prepolymer to 90 parts by weight of polyester resin material to approximately 60 parts by weight of prepolymer to 40 parts by weight of polyester resin.

Reinforcing fibers, such as fiberglass, are added to the SMC in a conventional manner. Once the fibers have been thoroughly admixed with the composition, the SMC is B-staged to a moldable consistency by aging at 90° to 104° F. for 3 to 5 days. After B-staging has occurred, the SMC may be stored for long periods of time without jeopardizing either its handleability or processability. After the material has been B-staged, it can be molded at 280° to 315° F. in 1 to 2 minutes, depending on the specific configuration, i.e. thickness, of the part being molded.

The following is given by way of example only, and is not intended in any way to be a limitation on the scope or spirit of the present invention as discussed or claimed.

EXAMPLE

|  | A | B | C | D |
|---|---|---|---|---|
| Polyester Resin | 70 | 70 | 70 | 70 |
| Polymethyl Methacrylate | — | — | 22.5 | 22.5 |
| t-Butyl Perbenzoate | 1 | 1 | 1 | 1 |
| Zinc Stearate | 2 | 2 | 2 | 2 |
| Fatty Acid phase stabilizing agent (50:45 palmitic:stearic) | 2 | — | 2 | — |
| Calcium Carbonate | 115 | 115 | 115 | 115 |
| Magnesium Hydroxide | 2.5 | 2.5 | 2.8 | 2.8 |
| Prepolymer in solvent (75 percent solids) | 30 | 30 | 7.5 | 7.5 |
| Phase Stability | acceptable | unacceptable | acceptable | unacceptable |

Substantially similar results are obtained when the fatty acid mixture is replaced, in whole or in part, with a $C_{20}$–$C_{36}$ dimer acid, a $C_{36}$ to $C_{54}$ trimer acid, a polyester polyol having a molecular weight of about 200 to about 6500 and an average functionality of 2 to 4, or mixtures thereof. Substantially similar results are also obtained when a fatty acid phase stabilizing agent of the present invention is added to the compositions disclosed in U.S. Pat. No. 4,535,110.

We claim:

1. A phase-stabilized sheet molding composition comprising:
   (a) an unsaturated polyester resin having a ratio of hydroxyl groups to carboxyl groups of approximately 5.7 to 0.8, an acid number of at least 14 and an average molecular weight of approximately 800 to 5,000;
   (b) a phase-stabilizing agent selected from the group consisting of:
      (i) a fatty acid having from about 5 to about 28 carbon atoms;
      (ii) a dimer or trimer acid having from about 20 to about 54 carbon atoms; or
      (iii) a polyester polyol containing polyester polyol, said polyol having an average molecular weight of about 200 to about 6,500 and an average functionality of about 2 to about 4; or mixtures of (i), (ii), or (iii);
   (c) an ethylinically unsaturated monomer and a free radical polymerization catalyst;
   (d) an inert filler;
   (e) a fiberous reinforcing material;
   (f) a mold release agent;
   (g) an isocyanate terminated urethane prepolymer dual functional additive having an equivalent ratio of NCO to OH from about 1.2/1 to about 5/1, comprising a polyol and a polyisocyanate, and being prepared by reacting:
      (i) one equivalent weight of a polyol having an average molecular weight of about 600 to 4,000 and an average funtionality of approximately 2 to approximately 6; and
      (ii) 1.2 to 5 equivalent weights of a polyisocyanate selected from the group consisting of 80:20 or 65:35 isomer mixture of the 2,4- and 2,6-isomeric forms of toluene di-isocyanate, ethylene di-isocyanate, propylene di-isocyanate, meta- and para-phenyl di-isocyanate, 4,4'-diphenyl methane di-isocyanate (MDI) or a mixture of MDI and its trifunctional cyclic adduct products containing carbodiimide linkages, 1,5-napthalene di-isocyanate, para- and meta-xylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic-/aliphatic polyisocyanates and polyfunctional aliphatic isocyanates;
   wherein said reactants combine in a one-step addition process to yield an isocyanate terminated urethane prepolymer of controlled molecule weight to impart improved low shrink, by covalently binding to the polyester resin matrix;
   (h) Group IIA metallic oxide or hydroxide; and
   (i) a linear oligomer of approximately 400 to 200,000 molecular weight; or mixtures of such oligomers; wherein said oxides and hydroxides
      (i) are present in an amount sufficient to react with at least 30 percent, but not more than 75 percent of the carboxyl groups present; and
      (ii) said prepolymer is present in an amount sufficient to react with at least 10 percent, but not more than 105 percent of the hydroxyl groups present thereby forming an SMC of improved Class A quality finish.

2. A composition according to claim 1 wherein said phase-stabilizing agent is a fatty acid selected from the group consisting of lauric, palmitic, stearic, oleic, linoleic, linolenic, caproic, caprylic, capric, myristic, palmitoleic, cerotic; cetoleic; and mixtures thereof.

3. A composition according to claim 2 wherein said phase-stabilizing agent is a fatty acid selected from the group consisting of myristic, lauric, palmitic, stearic, oleic, linoleic, linolenic, and mixtures thereof.

4. A composition according to claim 3 wherein said phase-stabilizing agent is a mixture of stearic, palmitic, and myristic acids.

5. A composition according to claim 1 wherein the phase-stabilizing agent is a dimer acid, a trimer acid, or mixtures thereof.

6. A composition according to claim 5 wherein said dimer acid is formed from the union of two monocarboxylic fatty acids each having about 18 carbon atoms.

7. A composition according to claim 1 wherein the phase-stabilizing agent is a polyester polyol; wherein said polyol has an average molecular weight of about 300 to about 5,000.

8. A composition according to claim 7 wherein the phase-stabilizing agent is a polyester polyol; wherein said polyol has an average molecular weight of about 400 to about 4,500.

9. A composition according to claim 8 wherein the phase-stabilizing agent is a polyester polyol; wherein said polyol has an average molecular weight of about 600 to about 4,000.

10. A composition according to claim 9 wherein the phase-stabilizing agent is a polyester polyol; wherein said polyol has an average molecular weight of about 1,000 to about 3,000.

11. A composition according to claim 7 wherein the polyol has an average functionality of about 2 to about 3.

12. A composition according to claim 11 wherein the polyol has an average functionality of about 2.

13. A composition according to claim 1 wherein the phase-stabilizing agent is present at a level of about 0.25 to about 20 percent, by weight of the unsaturated polyester resin.

14. A composition according to claim 13 wherein the phase-stabilizing agent is present at a level of about 1.0 to about 8 percent, by weight of the unsaturated polyester resin.

15. A composition according to claim 14 wherein the phase-stabilizing agent is present at a level of about 2 to about 7 percent, by weight of the unsaturated polyester resin.

16. A composition according to claim 15 wherein the phase-stabilizing agent is present at a level of about 3 to about 6 percent, by weight of the unsaturated polyester resin.

17. The sheet molding composition of claim 1 and further comprising:
a low shrink additive consisting essentially of a thermoplastic soluble in an ethylinically unsaturated monomer, said low shrink additive system present in an amount of approximately 10 to 55 parts by weight per 100 parts of resin.

18. The sheet molding composition of claim 1 wherein said reinforcing fiber is present in an amount of approximately 15 to 75 percent by weight.

19. The sheet molding composition of claim 1 wherein said inert filler is present in an amount of about 15 to 75 percent by weight.

20. The sheet molding composition of claim 18 wherein said reinforcing fiber is fiberglass.

21. The sheet molding composition of claim 1 wherein said Group IIA metal is selected from the group consisting of calcium, magnesium, and mixtures thereof.

22. The sheet molding composition of claim 1 wherein said metallic hydroxide is magnesium hydroxide.

23. The sheet molding composition of claim 1 wherein said metallic oxide is magnesium oxide.

24. The sheet molding composition of claim 1 wherein the ethylinically unsaturated monomer is comprised of the group styrene, vinyl acetate or vinyl toluene.

25. The sheet molding composition of claim 1 wherein the ethylinically unsaturated monomer is present in an amount to give 0.5 to 3.5 moles of monomer unsaturation per mole of unsaturation in the polyester resin.

26. The sheet molding composition of claim 1 wherein said ethylinically unsaturated monomer is styrene.

27. The sheet molding composition of claim 17 wherein said low shrink additive is dissolved in said ethylinically unsaturated monomer.

28. The sheet molding composition of claim 17 wherein said low shrink additive is comprised of the group consisting of polymethyl methacrylate, polyvinyl acetate, polyurethane, polyvinyl chloride, or any other similar linear oligomer.

29. The sheet molding composition of claim 27 wherein said low shrink additive is polyurethane.

30. The sheet molding composition of claim 1 wherein said metallic oxide is present in an amount sufficient to react with about 30 and about 75 percent of the carboxyl groups present.

31. A phase-stabilized sheet molding composition comprising:
(a) an unsaturated polyester resin having an average molecular weight of approximately 800 to 5,000;
(b) a phase-stabilizing agent selected from the group consisting of:
  (i) a fatty acid having from about 5 to about 28 carbon atoms;
  (ii) a dimer or trimer acid having from about 20 to about 54 carbon atoms; or
  (iii) a polyester polyol containing polyester polyol, said polyol having an average molecular weight of about 200 to about 6,500 and an average functionality of about 2 to about 4; or mixtures of (i), (ii), or (iii);
(c) an ethylinically unsaturated monomer and a free radical polymerization catalyst;
(d) an inert filler;
(e) a fiberous reinforcing material;
(f) a mold release agent;
(g) an isocyanate terminated urethane prepolymer dual functional additive having an equivalent ratio of NCO to OH from about 1.2/1 to about 5/1, comprising a polyol and a polyisocyanate, and being prepared by reacting:
  (i) one equivalent weight of a polyol having an average molecular weight of about 600 to 4,000 and an average funtionality of approximately 2 to approximately 6; and
  (ii) 1.2 to 5 equivalent weights of a polyisocyanate selected from the group consisting of 80:20 or 65:20 isomer mixture of the 2,4- and 2,6-isomeric forms of toluene di-isocyanate, ethylene di-isocyanate, propylene di-isocyanate, meta- and para-phenyl di-isocyanate, 4,4'-diphenyl methane di-isocyanate (MDI) or a mixture of MDI and its trifunctional cyclic adduct products containing carbodiimide linkages, 1,5-napthalene di-isocyanate, para- and meta-xylene di-isocyanates, alkylene di-isocyanates, or polymeric MDI containing an average of two isocyanate groups per molecule, toluene di-isocyanate, polyisocyanate prepolymers of aromatic type, toluene di-isocyanate based adducts, aromatic-/aliphatic polyisocyanates and polyfunctional aliphatic isocyanates;

wherein said reactants combine in a one-step addition process to yield an isocyanate teminated urethane prepolymer of controlled molecular weight to impart improved low shrink, dynamic impact strength and molding characteristics as measured by viscosity index properties in thermoset polyester resin products, and particularly sheet molding compositions (SMC) by covalently binding to the polyester resin matrix;

(h) a Group IIA metallic oxide or hydroxide; and (i) a linear oligomer of approximately 400 to 200,000 molecular weight; or mixtures of such oligomers;

wherein said oxides and hydroxides (i) are present in an amount sufficient to react with at least 30 percent, but not more than 75 percent of the carboxyl groups present; and (ii) said prepolymer is present in an amount sufficient to react with at least 10 percent, but not more than 105 percent of the hydroxyl groups present thereby forming an SMC of improved Class A quality finish.

32. A composition according to claim 31 wherein said phase-stabilizing agent is a fatty acid selected from the group consisting of lauric, palmitic, stearic, oleic, linoleic, linolenic, caproic, caprylic, capric, myristic, palmitoleic, cerotic, cetoleic, and mixtures thereof.

33. A composition according to claim 32 wherein said phase-stabilizing agent is a fatty acid selected from the group consisting of myristic, lauric, palmitic, stearic, oleic, linoleic, linolenic, and mixtures thereof.

34. A composition according to claim 33 wherein said phase-stabilizing agent is a mixture of stearic, palmitic, and myristic acids.

35. A composition according to claim 31 wherein the phase-stabilizing agent is a dimer acid, a trimer acid, or mixtures thereof.

36. A composition according to claim 35 wherein said dimer acid is formed from the union of two monocarboxylic fatty acids each having about 18 carbon atoms.

37. A composition according to claim 31 wherein the phase-stabilizing agent is a polyester polyol; wherein said polyol has an average molecular weight of about 300 to about 5,000.

38. A composition according to claim 37 wherein the phase-stabilizing agent is a polyester polyol; wherein said polyol has an average molecular weight of about 400 to about 4,500.

39. A composition according to claim 38 wherein the phase-stabilizing agent is a polyester polyol; wherein said polyol has an average molecular weight of about 600 to about 4,000.

40. A composition according to claim 39 wherein the phase-stabilizing agent is a polyester polyol; wherein said polyol has an average molecular weight of about 1,000 to about 3,000.

41. A composition according to claim 37 wherein the polyol has an average functionality of about 2 to about 3.

42. A composition according to claim 41 wherein the polyol has an average functionality of about 2.

43. A composition according to claim 31 wherein the phase-stabilizing agent is present at a level of about 0.25 to about 20 percent, by weight of the unsaturated polyester resin.

44. A composition according to claim 43 wherein the phase-stabilizing agent is present at a level of about 1.0 to about 8 percent, by weight of the unsaturated polyester resin.

45. A composition according to claim 44 wherein the phase-stabilizing agent is present at a level of about 2 to about 7 percent, by weight of the unsaturated polyester resin.

46. A composition according to claim 45 wherein the phase-stabilizing agent is present at a level of about 3 to about 6 percent, by weight of the unsaturated polyester resin.

47. The sheet molding composition of claim 31 and further comprising:
a low shrink additive consisting essentially of a thermoplastic soluble in an ethylinically unsaturated monomer, said low shrink additive system present in an amount of approximately 10 to 55 parts by weight per 100 parts of resin and carrier.

48. A method for producing an improved sheet molding composition which has an improved Class A surface finish comprising the steps of admixing the components defined in claim 1.

49. A method according to claim 48 wherein the phase-stabilizing agent is a mixture of stearic, palmitic, and myristic acids.

50. A molded article formed by the application of heat and pressure to the composition defined by claim 1.

51. A molded article formed by the application of heat and pressure to the composition defined by claim 4.

52. A molded article formed by the application of heat and pressure to the composition defined by claim 11.

53. A molded article formed by the application of heat and pressure to the composition defined by claim 31.

54. A composition according to claim 31 where a second low shrink additive is present.

* * * * *